June 9, 1936. H. H. STYLL ET AL 2,043,843
OPHTHALMIC MOUNTING
Filed Feb. 27, 1933
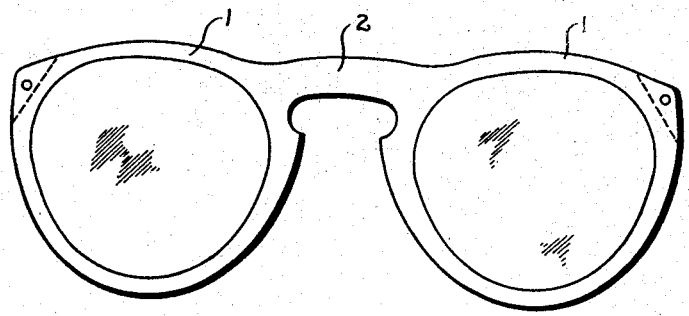
FIG. I.
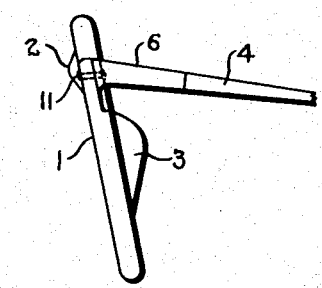
FIG. II.
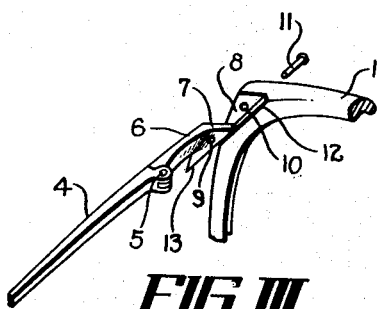
FIG. III.
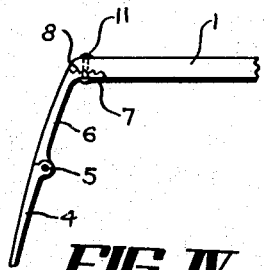
FIG. IV.
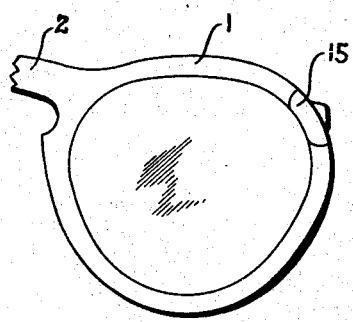
FIG. V.
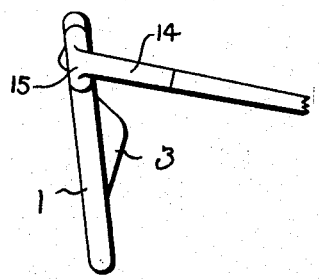
FIG. VI.
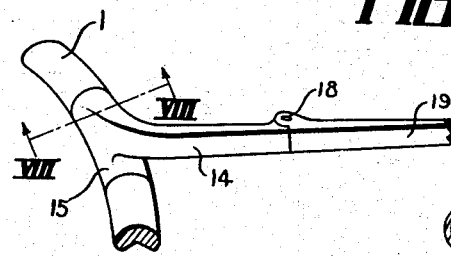
FIG. VII.
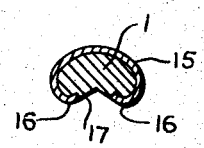
FIG. VIII.
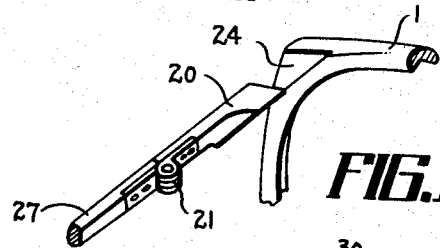
FIG. IX.
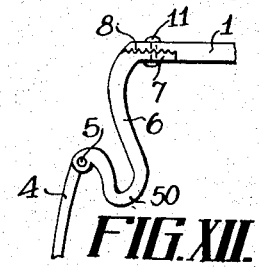
FIG. X.
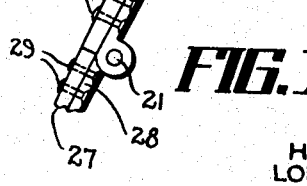
FIG. XII.
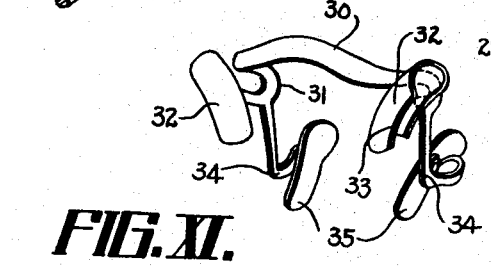
FIG. XI.
INVENTOR
HARRY H. STYLL
LOUIS L. GAGNON
BY
Harry H. Styll.
ATTORNEY Patented June 9, 1936

2,043,843

UNITED STATES PATENT OFFICE 2,043,843

OPHTHALMIC MOUNTING

Harry H. Styll and Louis L. Gagnon, Southbridge, Mass., assignors to American Optical Company, Southbridge, Mass., a voluntary association of Massachusetts Application February 27, 1933, Serial No. 658,825

5 Claims. (Cl. 88—53)

This invention relates to improvements in ophthalmic mountings, and to an improved process of making and fitting the same to the wearer.

One of the principal objects of the invention is to provide an ophthalmic mounting having its lens supporting parts formed of nonmetallic material and having adjustable means for supporting the temples or sides of the mountings so that the said temples may be adjusted sidewise, up or down, or varied in length as desired.

Another object of the invention is to provide novel means of fitting and attaching the temple supports to the lens holding means.

Another object is to provide means whereby the narrowing effect of connecting the temples high up adjacent the top of the lenses may be adjustably compensated for, so that the said temples may be quickly and easily adjusted to clear the sides of the wearer's head.

Another object is to provide temple supports of a rigid, ductile or resilient nature for use with a mounting of the above character.

Another object is to provide simple, efficient, and economical means of forming the parts of an ophthalmic mounting wherein the cost of material and assembling operations are greatly reduced.

Other objects and advantages of the invention will become apparent from the following description taken in connection with the accompanying drawing, and it will be apparent that many changes may be made in the details of construction, arrangement of parts and steps of the process shown and described without departing from the spirit of the invention as expressed in the accompanying claims. We, therefore, do not wish to be limited to the exact details shown and described as the preferred forms only have been shown by way of illustration.

Referring to the drawing,

Fig. I is a front elevation of an ophthalmic mounting embodying the invention.

Fig. II is a side elevation of Fig. I.

Fig. III is a fragmentary perspective view of the temple support showing it disunited from the lens holding means.

Fig. IV is a plan view of Fig. III with the parts assembled.

Fig. V is a fragmentary front elevation of a modified form of the invention.

Fig. VI is a side elevation of Fig. V.

Fig. VII is a fragmentary perspective view of the temple support shown in Fig. VI.

Fig. VIII is a sectional view taken on line VIII—VIII of Fig. VII.

Fig. IX is a view similar to Fig. III showing a further modification.

Fig. X is a plan view of Fig. IX.

Fig. XI is a perspective view of a modified form of bridge member.

Fig. XII is a view similar to Fig. IV showing a loop in the arm portion.

It has been usual, in the past, to form nonmetallic ophthalmic mountings of the above character from a single piece of nonmetallic material which was blanked to form the so-called fronts or combined lens holding and bridge members. It has been usual to form such fronts to various different sizes so that a mounting of the proper size could be selected to fit the requirements of the individual. Although these types of mountings proved quite satisfactory with respect to obtaining a comfortable fit with the nose of the wearer and of supporting the lenses in accurate prescribed relation with the eyes, it was found in many instances that much difficulty was encountered in obtaining a mounting wherein the temples or sides would not press into the flesh at the side of the head and hurt the wearer. This condition was particularly true in those cases where the temples were connected up high adjacent the top of the lenses as in the case of popular so-called high endpiece mountings of the day wherein the distance between the temples was much narrower than in cases where the temples were connected adjacent the horizontal center line of the lenses, because above the center line the edges of the lenses retreat toward the nose. This narrowing of the distance between the temples made it necessary to stock a greater number of sizes of mountings than was usual in the past. It was also necessary, in the past, in order to compensate for variations in the length of temples to carry a large stock of different size temples. It, therefore, is a principal object of this invention to provide means in combination with mountings of the above character whereby the temples or sides may be quickly and comfortably adjusted to the facial requirements of different individuals, particularly to compensate for variations in widths of heads and lengths of temples, and which will greatly reduce the number of stock sizes.

Referring more particularly to the drawing wherein like characters of reference designate like parts throughout the several views, the device embodying the invention as shown in Figures I to IV inclusive, comprises a pair of nonmetallic lens holding members 1, connected by an integral bridge member 2 and having integral nose rests 3 adjacent the nasal sides of the lens holding members.

The mounting is held on the face by the temples or sides 4 which are pivotally attached at 5 to an adjustable support 6. The support 6 is provided with an enlarged attaching end or foot 7 which is shaped to fit an attaching zone or seat 8 on the temporal side of the lens holding member 1. The attaching end or foot 7 and seat 8 are provided with aligned openings 9 and 10 through which a connecting member such as a rivet, screw, or other suitable means 11 is placed to secure the support 6 to the lens holding member 1. The seat engaging portion of the foot 7 is corrugated and the corrugations thereof are adapted to be forced into the nonmetallic material of the seat 8 when attached thereto. The support 6 as shown in Fig. II is normally located above the usual field of side vision and is adjustable up or down, in or out or may be varied in length as desired so that slight variations in the height of temple at this location may be obtained by the up and down adjustment, and variations in the widths of heads may be compensated for by the in or out adjustment in a direction sidewise of the mounting. The length of the temple 4 may be varied by bending the support 6 or by providing a plurality of different length supports, or the said support 6 may be provided with a looped portion 50—Fig. XII intermediate its ends by means of which it may be lengthened or shortened as desired. The support 6 may be formed rigid, ductile or resilient as desired and may be formed of any suitable material having one or more of the above characteristics or material treated in such a way as to have a portion thereof ductile and another portion thereof resilient or rigid. Attention is directed to the fact that the attaching seat 8 is provided with a shouldered portion 12 which is adapted to form an abutment for the angled edge 13 of the attaching head or foot 7. Although applicants have shown only one connecting member 11, it is apparent that they may use a plurality of such connecting members if desired.

In Figures V to VIII inclusive, there is shown a slight modification wherein the temple support 14 is provided with a clamp member 15 by means of which the said support may be secured to the rim. The clamp member 15 is adapted to embrace the lens holding rim 1 and is attached to said rim by pressing the side portions 16 about the rim and inwardly of the grooved portion 17 of said rim. The support 14 is provided with a temple hinge connection 18 to which the temple 19 is pivotally attached. The support 14 may be formed of any desired material and may be rigid, ductile or resilient or may have one or more of the above characteristics. These results may be accomplished by the proper selection and combination of materials or by the proper treatment of said materials. The support 14 may be adjusted sidewise, up or down, or varied in length as desired by bending or may be made variable in length by forming a loop portion intermediate its ends or may be formed to different lengths during the manufacture thereof so that a support of desired length may be selected prior to its attachment to the lens holding means. In either instance, the length of temple may be varied as desired by the proper selection and treatment of the support.

In Figures IX and X there is shown a further modification wherein the support 20 is preferably formed of a nonmetallic material similar to that of the lens holding means 1 and is adapted to be secured to said lens holding means by any suitable means. The support 20 is provided with a temple hinge member 21 which is attached thereto by rivets, screws or suitable means 22, and is provided with an enlarged attaching end or foot 23 which is adapted to be shaped to fit the attaching zone or seat 24 on the lens holding means 1. The support in this instance may be relatively rigid and may be angled or varied in length by the removal of the desired amount of material at the attaching end or foot 23, as shown by the dotted lines 25 and 26. It is apparent that when the end is angled as shown at 25 and is attached to the seat 24, the temple hinge member 21 will normally extend further away from the center of the lens holding means, or further outwardly at the sides of the mounting. If angled as shown at 26, the said hinge connection will extend more inwardly or nearer to the center of the lens holding means. The length of the support 20 is controlled by the amount of material removed from the attaching end or foot 23. In all instances the attaching end is shaped to fit within the recessed seat 24 and is held therein by cement, rivets, screws, or other suitable means. The temple 27 in this instance is provided with a hinge member 28, attached thereto by rivets or other suitable means 29, which is adapted to cooperate with the hinge member 21 on the support 20.

Attention is directed to the fact that although the supports 6, 14, and 20 are shown located above the useful field of side vision the said supports may be attached to the mounting at the horizontal center lines of the lens holding means, if desired.

The procedure of forming and fitting the mountings to the wearer is as follows:

A front having the required distance between the centers of the lens holding means to support the centers of the lenses in prescribed relation with the line of straight ahead vision of the eyes and to properly fit the nose of the wearer is first selected. The temples or sides are then adjusted up or down, sidewise or varied in length as desired to clear the sides of the wearer's head and to obtain the desired length of temple in a manner such as has been described above depending upon the nature and type of support used. The lenses having the required prescriptive characteristics are then mounted in the lens holding means by heating the said holding means so that the rim portions thereof may be expanded to allow the lenses to be placed in position of use. The lens holding means are then allowed to cool to secure the lenses in the rims.

Attention is directed to the fact that any desired temple support, 6, 14, or 20 may be used and that the said support may be adjusted to compensate for variations in the widths of heads and to obtain the desired height or length of temple as previously described.

Although applicants have shown the bridge member 2 as being integral with the lens holding members 1, the said bridge member may be formed separate thereof as shown in Fig. XI and may be attached to the lens holding members 1 by clamp members 32. With such an arrangement a plurality of different widths of bridges may be provided so that the desired pupillary distance may be obtained to fit different individuals or an adjustable bridge member may be provided whereby the distance between the lens holding members may be varied as desired. The bridge in this instance comprises a central arch portion 30 having rearwardly extending loop portions 31 which turn forwardly and are attached to the clamp members 32. The lens holding members 1 are placed within the clamp members 32 and are sealed therein by clamping the side portion 33 about the lens holding means or rims 1 in a manner similar to the clamp means 15 shown in Fig. VIII. The loop portions 31 are provided with depending guard arm supports 34 to which the nose pads or guards 35 are attached. This arrangement provides means whereby a mounting having temple supports such as shown at 14 may be provided with a bridge and nose rests which may be adjusted to the facial requirements of different individuals. The forming of the mounting merely necessitates the provision of a relatively annular shaped nonmetallic lens holding member to which the bridge and temple supports shown in Figures VII and XI may be attached.

From the foregoing description it will be seen that I have provided simple, efficient, and economical means of accomplishing all of the objects and advantages of the invention, particularly the provision of a nonmetallic type mounting having adjustable temple supports.

Having described our invention we claim:

1. In spectacles, a nonmetallic lens rim whose upper temporal side has a portion as wide as its width at its horizontal center line, a seat on said upper temporal side on the eye side of the rim, a relatively long and slender arm having a foot at one end shaped and secured to said seat, said arm extending outwardly and rearwardly of said foot and inclined downwardly to the rear of said foot, and terminating in a temple hinge connection, and the body of said arm lying substantially in the longitudinal line of the temple extended.

2. In spectacles, a nonmetallic lens rim whose upper temporal side has a portion as wide as its width at its horizontal center line, a seat on said upper temporal side on the eye side of the rim, a relatively long and slender arm having a flanged foot at one end shaped and secured to said seat, said arm extending outwardly and rearwardly of said foot and inclined downwardly to the rear of said foot, and terminating in a temple hinge connection, and the body of said arm lying substantially in the longitudinal line of the temple extended.

3. In spectacles, a nonmetallic lens rim whose upper temporal side has a portion as wide as its width at its horizontal center line, a seat on said upper temporal side on the eye side of the rim, a relatively long and slender arm having a foot at one end shaped and secured to said seat, and having a loop portion intermediate its ends, said arm extending outwardly and rearwardly of said foot and inclined downwardly to the rear of said foot, and terminating in a temple hinge connection and the body of said arm lying substantially in the longitudinal line of the temple extended.

4. In spectacles, a nonmetallic lens rim, a seat on the upper temporal side on the eye side of the rim, a relatively long and slender arm having a foot at one end shaped and secured to said seat with the arm extending outwardly and rearwardly of said foot and inclined downwardly to the rear of said foot and terminating in a temple hinge connection.

5. In spectacles, a nonmetallic lens rim, an attaching seat on the upper temporal side on the eye side of the rim, a relatively long and slender arm having an enlarged attaching portion at one end provided with a contact face to engage the seat, and a temple hinge connection at its opposite end and means for securing the enlarged portion to said seat, said contact face being inclined with respect to the longitudinal axis of the long and slender arm so as to support the said arm in an outwardly, rearwardly and downwardly extending position with respect to the plane of the attaching seat when in secured relation with said seat.

HARRY H. STYLL.
LOUIS L. GAGNON.